May 25, 1937.  N. G. A. MALMQUIST  2,081,672
BRAKE ROD COUPLER
Filed April 10, 1935   2 Sheets-Sheet 1
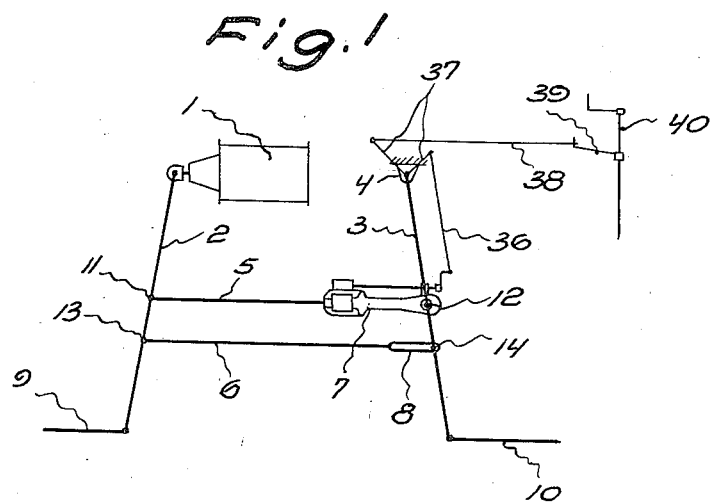
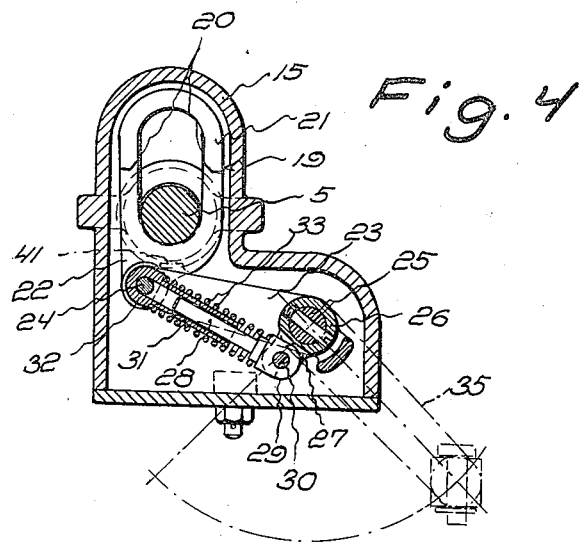
Inventor:
N. G. A. Malmquist
By E. F. Wenderoth
atty May 25, 1937. N. G. A. MALMQUIST 2,081,672
BRAKE ROD COUPLER
Filed April 10, 1935   2 Sheets-Sheet 2
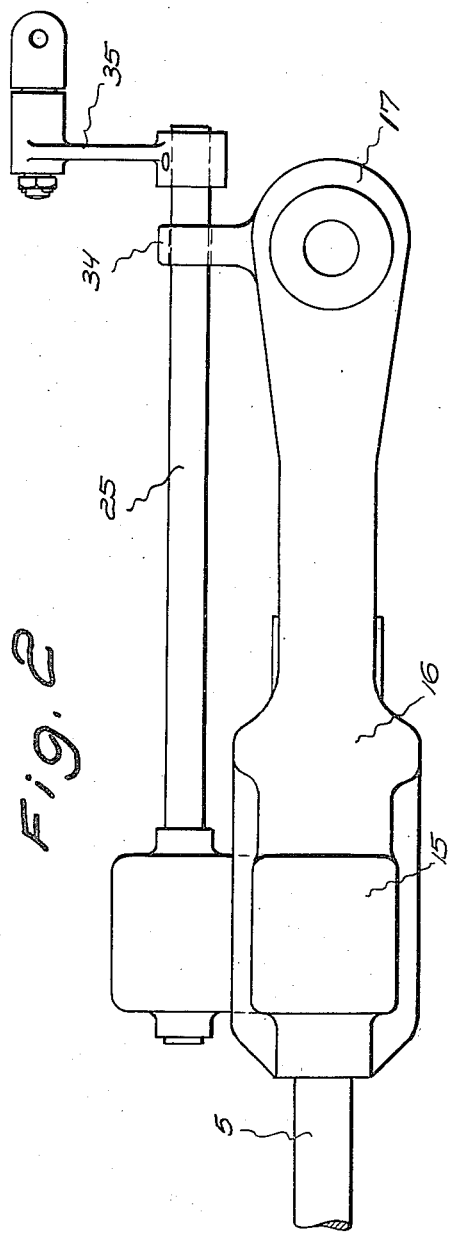
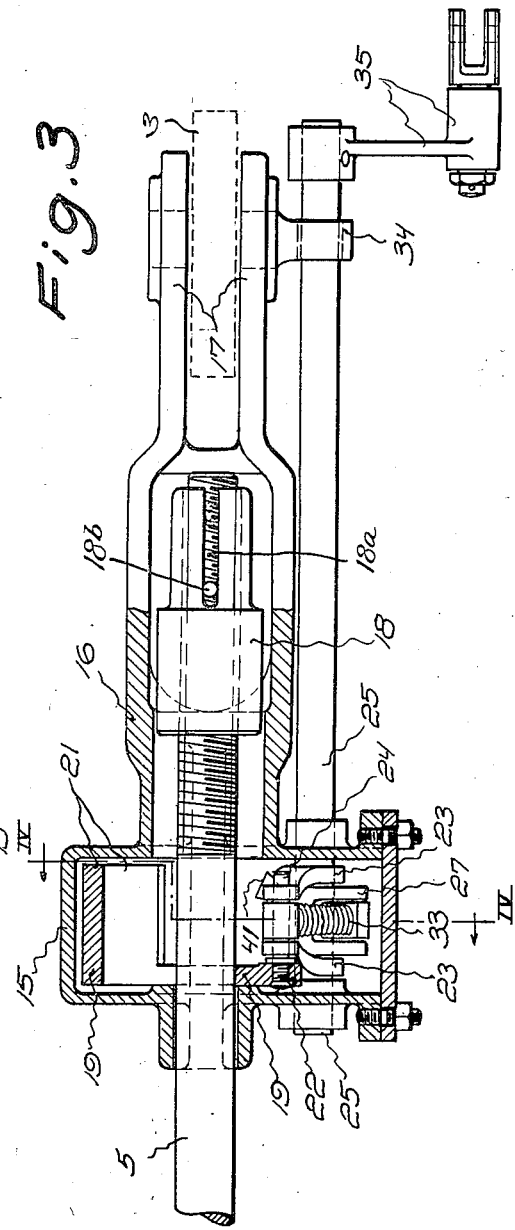
Inventor:
N. G. A. Malmquist
By E. F. Wendiroth
Atty Patented May 25, 1937

2,081,672

UNITED STATES PATENT OFFICE 2,081,672

BRAKE ROD COUPLER

Nils Gunnar August Malmquist, Malmo, Sweden, assignor to Svenska Aktiebolaget Bromsregulator, Malmo, Sweden, a corporation of Sweden Application April 10, 1935, Serial No. 15,691

7 Claims. (Cl. 188—195)

This invention relates to brake riggings, especially for railway cars, of the type in which the leverage of the brake rigging can be changed for the purpose of suiting the braking pressure to empty and loaded cars, for instance, by coupling and uncoupling one or more tie rods for one or more levers of the brake rigging. More particularly, the invention relates to a device for effecting this coupling and uncoupling of said tie rod or rods, the invention having for its object to provide such a device which is simple in construction and efficient in operation and can be easily mounted in brake riggings of the type in which the brake levers are of single thickness and the tie rods are connected to them by means of forked cross heads or jaws.

Further objects of the invention will be apparent from the following detailed description of one practical embodiment thereof, which is illustrated in the accompanying drawings in which:—

Fig. 1 is a diagrammatic plan view of a brake rigging and illustrates one way of mounting the rod coupler.

Fig. 2 is a plan view on a larger scale of the rod coupler.

Fig. 3 is a side view, partially in section, of the rod coupler.

Fig. 4 is a cross section substantially on the line IV—IV in Fig. 3.

Referring first to Fig. 1, 1 is the brake cylinder, 2 is the live brake lever linked to the cylinder piston head, and 3 is the dead brake lever linked to the fixed pivot 4, while 5 and 6 are two tie rods between the levers 2 and 3. The rod 5 is provided with a coupler 7 according to the invention for coupling and uncoupling this rod, while the rod 6 is provided with a long-slot 8 at one end. The rod 5 determines a lower leverage ratio suitable for braking the car when empty, and the rod 6 determines a higher leverage ratio suitable for braking the car when loaded. Main pull rods 9 and 10 are connected to the free ends of the brake levers 2 and 3, respectively, and extend towards opposite ends of the car where they are connected to the brake rigging elements associated with the brake shoes for coaction with wheels of the car, as is well known in the art.

The two tie rods are rendered operative selectively by coupling and uncoupling the rod 5. When the rod 5 is rendered operative the points 11 and 12 at which the rod 5 is linked to the brake levers 2 and 3, respectively, serve as fulcrums for said levers during braking, and the points 13 and 14 at which the rod 6 is linked to the brake levers are free to move relatively to each other due to the long-slot 8. A rod coupler such as the coupler 7 in the rod 5 could be provided also in the rod 6, but this is not necessary because the rod 6, for instance by means of the said long-slot 8, can be arranged so that it automatically becomes inoperative when the rod 5 is rendered operative, and automatically becomes operative when the rod 5 is rendered inoperative by uncoupling the coupler 7.

This manner of selectively rendering two or more brake rods operative by means of one or more rod couplers for selectively producing two or more different leverage ratios is known in the art, and the invention relates to the construction of the rod coupler with a view to simplify and improve the same and make it suitable for use in brake riggings of the type in which the brake levers are of single thickness, and in brake riggings in which the dead brake lever is inverted in relation to the live brake lever. In brake riggings in which the brake levers are double, that is each of the brake levers consists of two spaced plates, a simple construction can be obtained by linking the tie rod to the lever between the two plates thereof and provide the tie rod with a projecting end and arrange the rod coupler on this projecting end, as shown by Carlbom in the co-pending application Ser. No. 752,167, filed Nov. 8, 1934. This construction, however, cannot be applied to a brake rigging having brake levers of single thickness because certain difficulties will be met with due to the fact that the tie rod must embrace the lever. When providing a rod coupler in a brake rigging in which the dead brake lever is inverted in relation to the live brake lever it is preferable to place the rod coupler in a tie rod between the live brake lever and an intermediate dead lever and to connect this intermediate lever by means of a rod to the inverted dead brake lever, as shown by Browall in the co-pending application Ser. No. 8,746, filed Feb. 28, 1935. Also in such a case certain difficulties will be met with if the rod coupler or leverage changing mechanism is constructed so as to be placed on the outside of the said intermediate lever. Therefore, it is desirable to construct the rod coupler so that it can be disposed entirely between the ends of the rod to be coupled and uncoupled thereby. The invention provides a rod coupler of such a construction that it easily can be disposed in this way.

Referring now to Figs. 2–4 which illustrate a preferred embodiment of the rod coupler according to the invention, this rod coupler comprises a casing 15 having an axial extension 16 provided at its free end with a forked cross head 17 adapted to embrace the brake lever and to be linked thereto by means of a bolt. A tie rod such as the tie rod 5 shown in Fig. 1, which is adapted to be coupled and uncoupled by means of the coupler, extends axially through the casing 15, 16 and is slidable therein and guided thereby. The end portion of the tie rod 5 is screw threaded and provided with an adjustable nut 18 which is guided in the extension 16 of the casing 15. For locking the nut 18 in adjusted position on the rod 5, the nut may be provided with longitudinal slots 18a and the rod 5 with a pin hole for a removable pin 18b. The nut 18 is adapted to serve as an abutment for coaction with an abutment 19 which is housed in the casing 15 and is shiftable in and out of an active position in which it serves to reduce the axial play or idle motion provided for between the tie rod 5 and the casing 15, 16. When in active position the abutment 19 serves the purpose of rendering the tie rod 5 operative when braking. The shiftable abutment 19 is loop-shaped, the opening thereof having the form of a long-slot 20 of a width but slightly greater than the diameter of the rod 5 which extends through this long-slot 20 and guides the abutment 19 which is movable transversely to the rod 5, preferably in the vertical direction. The loop-shaped abutment 19 is disposed adjacent to the outer end wall of the casing 15, and at one end, preferably the upper end, the loop-shaped abutment 19 is provided with an arc-shaped projection 21 extending axially towards the opposite end wall of the casing 15, which is adjacent to the extension 16. At its lower end the loop-shaped abutment 19 is provided with an ear 22 and linked to interconnected arms 23 by means of a bolt 24 passing through the ear 22 and the free ends of the arms 23 which are rotatably mounted on a shaft 25 journaled in the lower part of the casing 15 and parallel to the tie rod 5. Between the arms 23 there is secured on the shaft 25 a hub 26 provided with a forked arm or ear 27, and a spindle 28 having a cross head 29 at one end, is linked to the ear 27 by means of a bolt 30, as is most clearly shown in Fig. 4. The spindle 28 is slidable in a sleeve 31 which by means of a cross head 32 is linked to the bolt 24 between the arms 23, and a compression spring 33 is inserted between the cross heads 29 and 32 of the spindle and the sleeve, respectively. The shaft 25 is adapted to be set into either of two angular positions, and when the shaft 25 is set in one of these positions, which is shown in Fig. 4, the action of the spring 33 tends to move and retain the abutment 19 in the raised position shown in Fig. 4. In this position of the abutment 19 the projection 21 thereof is out of the path of the nut 18 and, therefore, the abutment 19 is inactive in this position. When the shaft 25 is set in the other position which is obtained by rotating the shaft through an angle of about 90 degrees, the action of the spring 33 tends to move and retain the abutment 19 in lowered position in which the projection 21 lies in the path of the nut 18 and, therefore, is active for reducing the axial play or idle motion between the tie rod 5 and the casing 15, 16 for the purpose of rendering this tie rod 5 operative when braking.

Means of any known or suitable kind may be used for setting the shaft 25 in either of the two positions hereinbefore described. In the embodiment shown the shaft 25 is extended to the cross head end of the casing 15, 16 and journaled in a projecting ear 34 on the cross head 17, the shaft on its projecting end being provided with a crank arm 35. As illustrated in Fig. 1 by way of example this crank arm 35 is connected by means of a link rod 36 to a bell crank lever 37 pivoted on the pivot 4 for the dead brake lever 3 and connected by means of a link rod 38 to an arm 39 on a setting shaft 40 which is well known in the art.

Due to the arrangement of the spring device which includes the spring 33 and connects the shiftable abutment 19 with the ear or arm 27 on the shaft 25, it is possible to reset the shaft 25 also when the brakes are applied and the abutment 19 jammed. The spring device will then shift the abutment into the new position corresponding to the reset position of the shaft 25 as soon as the stresses in the brake rigging cease at the release of the brake.

One of the arms 23 is provided with an oblique or cam surface 41 which in the inactive position of the abutment 19 lies in the path of the nut 18 and will be depressed thereby at each braking operation which is performed with the abutment 19 set in the inactive position. This depression of the arms 23 causes a slight motion of the abutment 19 at each such braking operation, and through this slight motion the abutment 19 and the movable parts associated therewith are effectively prevented from growing fast due to formation of rust, ice or the like.

If the setting mechanism for the shaft 25 becomes inoperative, for instance because a bolt in the linkage thereof works loose, when the shiftable abutment 19 is set in the inactive position, the shiftable abutment will drop into the active position under the action of its weight. Therefore, if the abutment 19 is set in the inactive position, it automatically will take the active position, if the positive control thereof through the setting mechanism accidentally becomes deficient and fails to operate. Thus, the higher leverage ratio cannot become operative unintentionally and cause skidding of the wheels of an empty car at the application of the brakes.

The invention is not limited to the exact form shown in the drawings for obviously changes may be made therein within the scope of the claims.

What I claim and desire to secure by Letters Patent is:—

1. A brake rod coupler comprising a casing having an axial extension at one end, a rod axially slidable through said casing and guided in an end wall thereof, said rod having an end portion projecting into the extension of the casing, an abutment on said projecting end portion of said rod, an abutment member movable in said casing transversely to said rod in and out of an active position, said movable abutment member having an axially projecting portion which in the active position of said member lies in the path of the abutment on the rod, means for selectively setting the said movable abutment member in and out of the active position, and a crosshead carried by the free end of said extension.

2. A brake rod coupler comprising a casing having an axial extension at one end, a rod axially slidable through said casing and guided in an end wall thereof, said rod having an end portion projecting into the extension of the casing, an abutment on said projecting end portion of said rod, an abutment member movable in said casing transversely to said rod in and out of an active position, said movable abutment member having an axially projecting portion which in the active position of said member lies in the path of the abutment on the rod, and means for selectively setting said movable abutment member in and out of active position, said movable abutment member being loop-shaped, and said rod extending through and guiding the transverse movement of said abutment member.

3. A brake rod coupler comprising a casing having an axial extension at one end, a rod axially slidable through said casing and guided in an end wall thereof, said rod having an end portion projecting into the extension of the casing, an abutment on said projecting end portion of said rod, an abutment member movable in said casing transversely to said rod in and out of an active position, said movable abutment member having an axially projecting portion which in the active position of said member lies in the path of the abutment on the rod, and means for selectively setting said movable abutment member in and out of active position, said rod extending through said transversely movable abutment member, said member being provided with a long-slot for said rod, said long-slot being of a width slightly greater than the diameter of the rod.

4. A brake rod coupler comprising a casing having an axial extension at one end, a rod axially slidable through said casing and guided in an end wall thereof, said rod having an end portion projecting into the extension of the casing, an abutment on said projecting end portion of said rod, an abutment member movable in said casing transversely to said rod in and out of an active position, said movable abutment member having an axially projecting portion which in the active position of said member lies in the path of the abutment on the rod, and means for selectively setting said movable abutment member in and out of active position, said last-named means including a shaft journaled in said casing parallel to said rod and adapted to be set in either of two angular positions, said transversely movable abutment member being articulated to arms rotatably mounted on said shaft and connected to an arm which is secured on said shaft by means of a spring device which in one of the said angular positions of the shaft tends to move and retain the movable abutment member in active position and in the other of said angular positions of the shaft tends to move and retain the movable abutment member in inactive position.

5. A brake rod coupler, comprising a casing having an axial extension ending in a forked cross head, a rod axially slidable through the casing and the extension thereof, said rod having a screw threaded end portion, an adjustable abutment nut screwed on said end portion of the rod and guided in the extension of the casing, the rod being guided in the remote end wall of the casing, a loop-shaped abutment member housed in said casing and movable therein transversely to the rod and guided thereby, the opening of the loop-shaped abutment member, through which the rod passes, being in the form of a long-slot of a width but slightly greater than the diameter of the rod, an arc-shaped axial projection on one end of the loop-shaped abutment member, which extends towards the extension of the casing and in an active position of the loop-shaped abutment member lies in the path of the abutment nut on the rod to limit axial displacement between the rod and the casing in one direction, and means for selectively setting said movable abutment member into the said active position and into an inactive position in which the said projection on the abutment member is out of the path of the nut on the rod.

6. A brake rod coupler as claimed in claim 5, in which the means for setting the movable abutment member in and out of active position includes a shaft journaled in the casing and parallel to the rod, arms rotatably mounted on said shaft and linked at their free ends to the movable abutment member, an arm secured to said shaft, a spring device connecting the movable abutment member with the last mentioned arm and adapted, when the shaft is set in one or the other of two predetermined angular positions, to move and retain the movable abutment member in the active or inactive position, respectively, one of the first-mentioned arms being provided with a cam surface which in the inactive position of the movable abutment member lies in the path of the abutment nut on the rod and is depressed thereby at each braking operation with the movable abutment member in the inactive position, whereby the movable abutment member is moved slightly at each such braking operation.

7. A brake rod coupler as claimed in claim 5, in which the means for setting the movable abutment in and out of active position includes a shaft which is parallel to the rod and is journaled in the casing and extends outside of the extension of the casing to the cross head and is journaled also in a projecting ear on the cross head.

NILS GUNNAR AUGUST MALMQUIST.